G. G. NOYES.
CANCELING STAMP.
No. 108,619.  Patented Oct. 25, 1870.
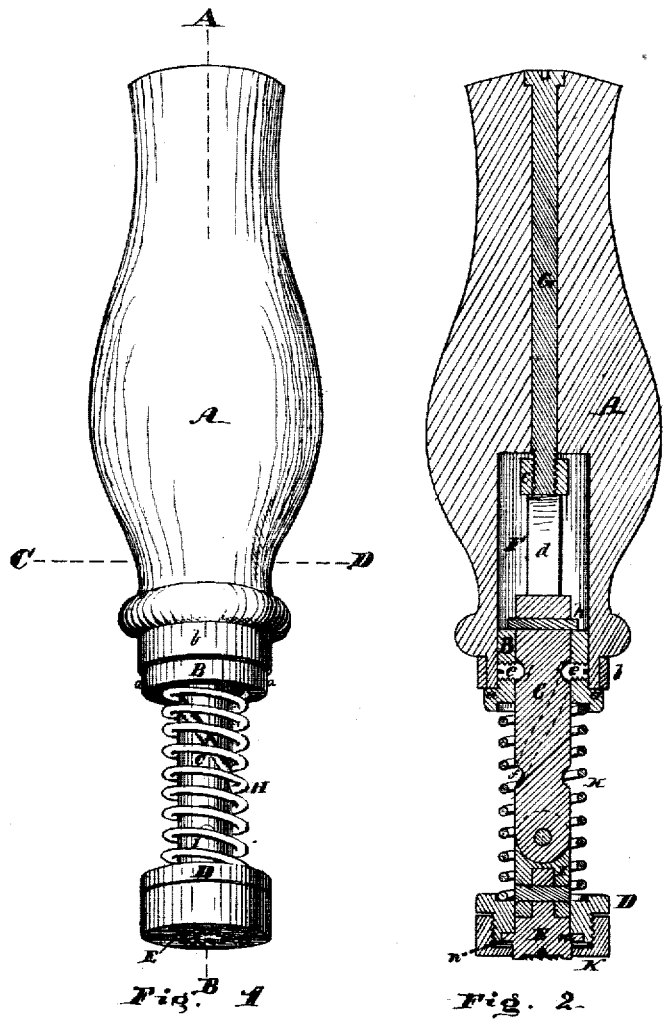
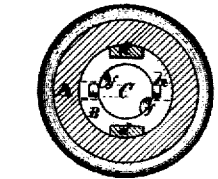
Fig. 3.
Sect. on C, D, Fig. 1.
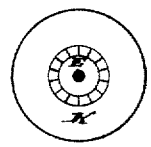
Fig. 4.
Witnesses
Thos. H. Dodge
A. C. Pierce
Inventor
George G. Noyes.

United States Patent Office.

GEORGE G. NOYES, OF WORCESTER, MASSACHUSETTS.

Letters Patent No. 108,619, dated October 25, 1870.

IMPROVEMENT IN CANCELING-STAMPS.

The Schedule referred to in these Letters Patent and making part of the same.

*To all whom it may concern:*

Be it known that I, GEORGE G. NOYES, of the city and county of Worcester and Commonwealth of Massachusetts, have invented certain new and useful Improvements in Canceling-Tools, for defacing postage and revenue stamps; and I do hereby declare the following to be a full, clear, and exact description of the same, reference being had to the accompanying drawing which forms a part of this specification, in which—

Figure 1 represents a perspective view of my improved canceling-tool;

Figure 2 represents a central vertical section, line A B, fig. 1;

Figure 3 represents a transverse horizontal section, line C D, fig. 1; and

Figure 4 represents the face of the tool.

To enable those skilled in the art to which my invention belongs to make and use the same, I will proceed to describe it more in detail.

The nature of my invention consists in an improved canceling-tool, for canceling postage and revenue stamps, as hereinafter explained.

In the drawing—

The part marked A represents the handle;

B, the shank;

C, the spindle;

D, the head; and

E, the cutter.

The handle A is bored out at its lower end, as shown at F, to receive the shank B, which latter is provided with a flange, *a*, that rests against the ferrule *b*, on the lower end of the handle A, while said shank B is held securely in place by means of a screw, G, that passes down through the center of the handle A from its top end, and screws into the nut *c* of the shank B, as indicated in fig. 2 of the drawing.

The lower part of the shank B is joined to the upper part of nut *c* by two vertical arms, *d*, so constructed as to allow space for the spindle C, which spindle is arranged through the lower part of the shank B in such a way that, when the tool is pressed down upon the stamp, the spindle C is forced up into the handle, and, at the same time, a rotary motion is imparted thereto, and also to the cutter E, by means of screws *e*, set in the shank B, with their ends fitted into spiral grooves *f*, formed around the spindle C.

The spindle C is pressed outward by means of a spiral-wire spring, H, coiled around its outside, one end of which rests against the shank B, and the other against the head D, said parts being provided with suitable depressions, to receive and hold the ends of the spring H.

A pin, *h*, is set in the upper end of the spindle C, which strikes upon the shank B, and prevents the spring H from throwing the spindle C too far out.

At the lower end of the spindle C is arranged a circular cutter, E, which is connected to the spindle C by a double joint, I, so that the cutter E and face-plate K will always set squarely down upon the stamp to be canceled.

The head-piece D, which surrounds the cutter E, is recessed at its lower side, to receive an annular flange, *m*, formed around the cutter, and by means of which, the several parts are retained in correct relative positions.

The head-piece D is also provided with a screw-thread upon its outer side, upon which is screwed the face-plate K, as shown.

The depth to which the cutter E works is regulated and adjusted by means of annular washers *n*, inserted between the face-plate K and head-piece D, as indicated in fig. 2 of the drawing.

The groove in the head-piece D, into which is fitted the flange *m* of the cutter E, is made of such depth that the face-plate K of washers *n* cannot bind upon said flange *m* when the parts are screwed together. Thus the cutter E is at all times permitted free action.

The cutter E, in this instance, is made with a circle of sharp teeth, similar to ratchet-teeth, and the operation of canceling is performed in the following manner:

The operator, taking the tool by the handle A, strikes the face-plate K down upon the stamp to be canceled with a quick elastic blow, applying sufficient force to press the spindle C up into the handle A, whereby a rotary motion is imparted to the spindle C and cutter E, as before explained, and a portion of the paper of the stamp is cut away by the teeth of the cutter, thereby most effectually defacing said stamp.

The portion of the paper cut away from the stamp corresponds in shape and size to the row of teeth on the cutting-tool.

In the present instance a ring is cut, leaving a portion of the stamp uninjured at its center and around the outside; but, if desired, other forms of cutters may be used.

In lieu of forming spiral grooves *f* in the spindle C, to impart the rotary motion to the cutter, said spindle may be provided with spiral flanges, to run in grooves formed in the shank, or the whole spindle may be formed flat, and twisted like an auger, and the shank be formed to correspond; but I prefer to make them as shown.

If desired, a collar may be fixed to the upper end of the spindle, in lieu of the pin *h*, for holding the spindle against the action of spring H.

A dating-stamp may be combined with the canceling-stamp, if desired.

Having described my improved canceling-tool,

What I claim therein as new and of my invention, and desire to secure by Letters Patent, is—

1. The combination, with the spindle C, provided with a universal joint, I, of the canceling-cutter E, substantially as described.

2. The combination, with the head D and face-plate K, of the rotating cutter E, provided with a flange, m, substantially as and for the purposes set forth.

3. The combination, with the handle A and shank B, provided with nut c, of the holding-bolt or screw G and flange a, substantially as and for the purposes set forth.

GEORGE G. NOYES.

Witnesses:
THOS. H. DODGE,
A. E. PEIRCE.